United States Patent [19]

Davenport et al.

[11] Patent Number: 4,958,263
[45] Date of Patent: Sep. 18, 1990

[54] CENTRALIZED LIGHTING SYSTEM EMPLOYING A HIGH BRIGHTNESS LIGHT SOURCE

[75] Inventors: John M. Davenport, Lyndhurst; William W. Finch, Richmond Heights; Richard L. Hansler, Pepper Pike; Richard C. Nagle, Euclid; Ronald S. White, Mentor, all of Ohio

[73] Assignee: General Electric Company, Schenectady, N.Y.

[21] Appl. No.: 266,129

[22] Filed: Nov. 2, 1988

[51] Int. Cl.⁵ .............................................. F21V 7/04
[52] U.S. Cl. ........................................ 362/32; 362/61; 362/74; 362/255; 362/263
[58] Field of Search ................. 362/32, 261, 262, 331, 362/255, 61, 74, 263

[56] References Cited

U.S. PATENT DOCUMENTS

| 3,131,690 | 5/1964 | Innis et al. | 362/32 X |
|---|---|---|---|
| 3,455,622 | 7/1969 | Cooper | 362/32 X |
| 3,596,083 | 7/1971 | Lovering | 362/32 |
| 3,770,338 | 11/1973 | Helmuth | 362/32 X |
| 4,380,791 | 4/1983 | Nishizawa | 362/32 X |
| 4,597,030 | 6/1986 | Brody et al. | 362/32 |
| 4,683,524 | 7/1987 | Ohta | 362/32 X |
| 4,740,870 | 4/1988 | Moore et al. | 362/32 |
| 4,757,427 | 7/1988 | Oostvogels et al. | 362/32 |
| 4,811,172 | 3/1989 | Davenport et al. | 362/32 X |

FOREIGN PATENT DOCUMENTS 11934  1/1984  Japan ................................... 362/74

Primary Examiner—Stephen F. Husar
Attorney, Agent, or Firm—John P. McMahon; Stanley C. Corwin; Fred Jacob

[57] ABSTRACT

A centralized lighting system particularly suited for aerodynamically styled vehicles is disclosed. The centralized lighting system employs a pressurized lamp preferably of a metal halide having quartz light guides merged into portions of its outer surface. The portions of the metal halide lamp that are not merged with the light guides may be coated with a diffusive reflective coating that substantially prevents light from being transmitted through the coating so that all of the light generated by the metal halide lamp is directed into and transmittd by the light guides. The transmitted light of the light guide is distributed throughout vehicle to supply the forward, rearward, and interior illumination needs of the vehicle.

37 Claims, 5 Drawing Sheets

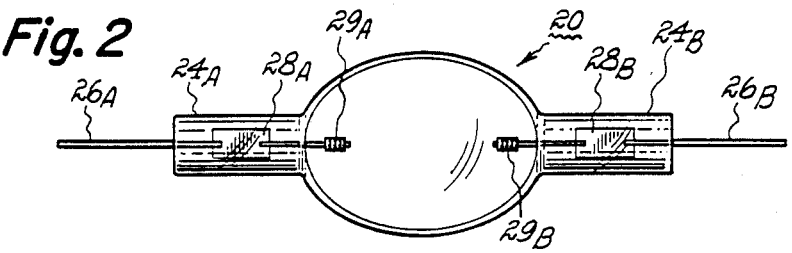
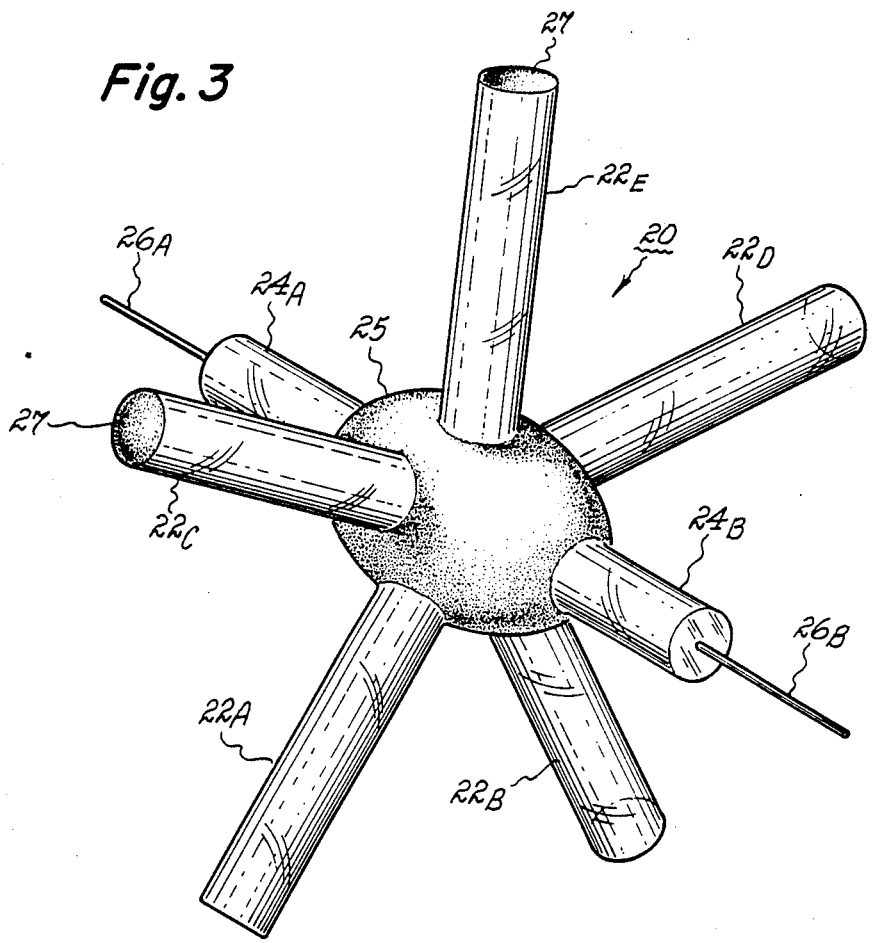

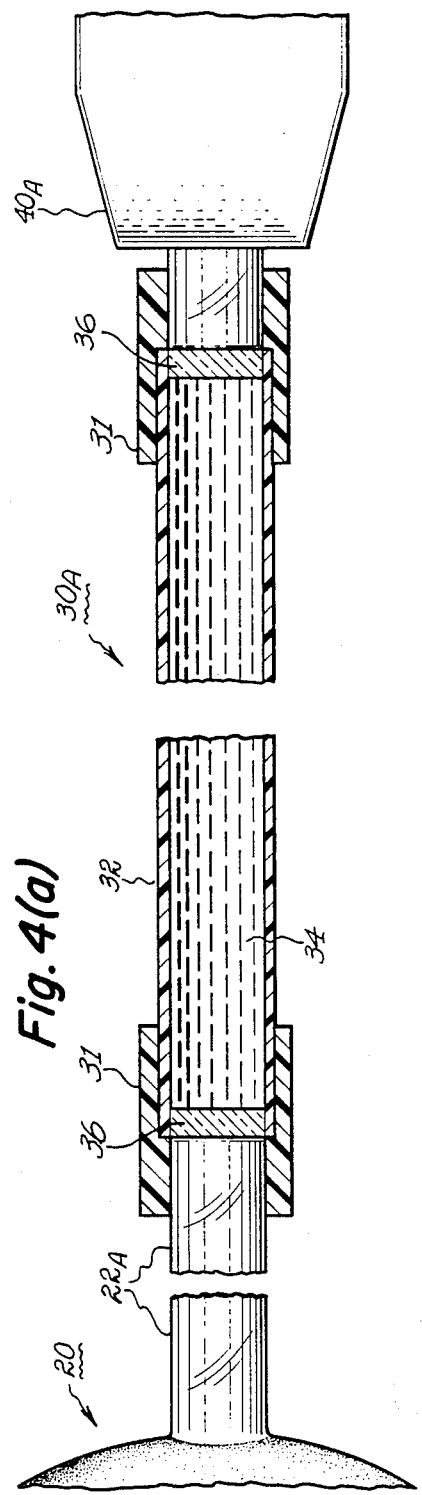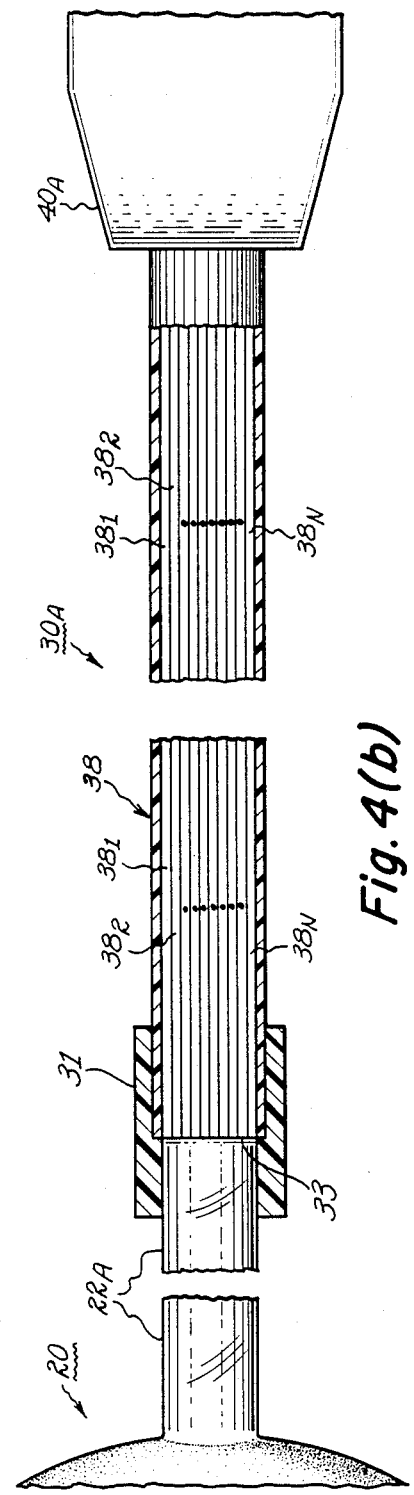

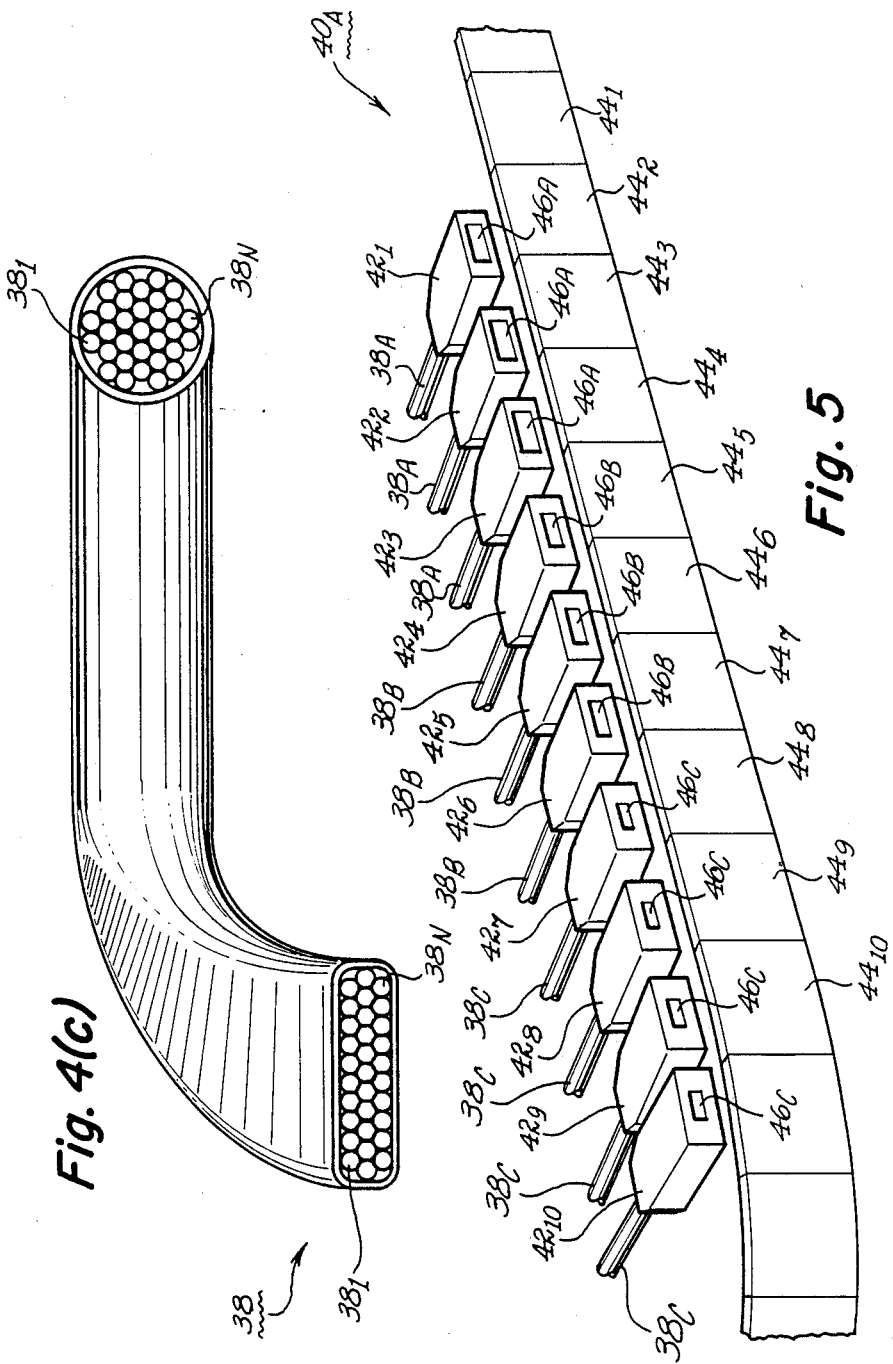

CENTRALIZED LIGHTING SYSTEM EMPLOYING A HIGH BRIGHTNESS LIGHT SOURCE

BACKGROUND OF THE INVENTION

The present invention relates to a lighting system, and more particularly, to a centralized lighting system especially suited to provide the illumination needs of a vehicle or structure and comprising a high brightness light source which is coupled to optical light carrying devices.

As discussed in U.S. Patent Application Ser. No. 123,844 filed Nov. 23, 1987, now U.S. Pat. No. 4,811,172, and assigned to the same assignee as the present invention, it is known that fiber optics may be used efficiently to carry the output of a light source to various locations without encountering substantial transmission losses. The optical fibers in cooperation with the high brightness light source is particularly suited for use in various space restrictive applications such as encountered for aerodynamically styled automotive vehicles.

Similarly, as disclosed in U.S. Patent Application Ser. Nos. 157,360; 157,359, now U.S. Pat. No. 4,868,458; and 157,436 all filed Feb. 18, 1988, the efficiency of the lighting systems for aerodynamically styled vehicles may be improved over incandescent light sources by the use of gas discharge lamps serving as the high brightness light source. It is desired that further efficiency improvements be made in to the high brightness light source. In addition, it is desired that a single light source be provided and centrally located to serve all of the illumination needs of the vehicle. Such a centrally located light source needs to accommodate the various lighting requirements of the vehicle necessary to provide the forward, rearward, and interior illumination of the vehicle. Further, it is desired that the centrally located lighting system efficiently distributes the light generated by the light source.

Accordingly, it is an object of the present invention to provide a centralized lighting system employing optical fibers to efficiently distribute the light throughout a vehicle to serve all of the illumination needs of the vehicle.

It is a further object of the present invention to provide a high brightness light source integrated to take advantage of the central location.

SUMMARY OF THE INVENTION

The present invention is directed to a centralized lighting system particularly suited for aerodynamically styled vehicles comprising an integrated high brightness light source that is coupled to an optical distribution system.

The light generating and distribution system for the vehicle comprises a light source having an envelope formed of a transparent refractory material, like quartz and containing a suitable fill. The light source further has at least one light guide formed of the same or similar material as the light source and merged into the outer surface of the envelope. The output of the light source is distributed by light carrying devices having one end connected to the light source and another end connected to an illuminating device of the vehicle. In one embodiment the light carrying device comprises a liquid filled arrangement formed of a plastic material, whereas, in another embodiment the optical carrying device comprises a plurality of light fibers arranged into a bundle.

BRIEF DESCRIPTION OF THE DRAWING

FIG. 2 is an illustration of a portion of the integrated high intensity light source of the present invention.

FIG. 3 is a perspective illustration of the integrated high intensity light source of the present invention.

FIGS. 4(a), (b), and (c) are drawings of various light carrying devices related to the present invention.

FIG. 5 illustrates the arrangement of an illuminating device related to the invention.

DETAILED DESCRIPTION OF THE PREFERRED EMBODIMENTS

Figure 1:
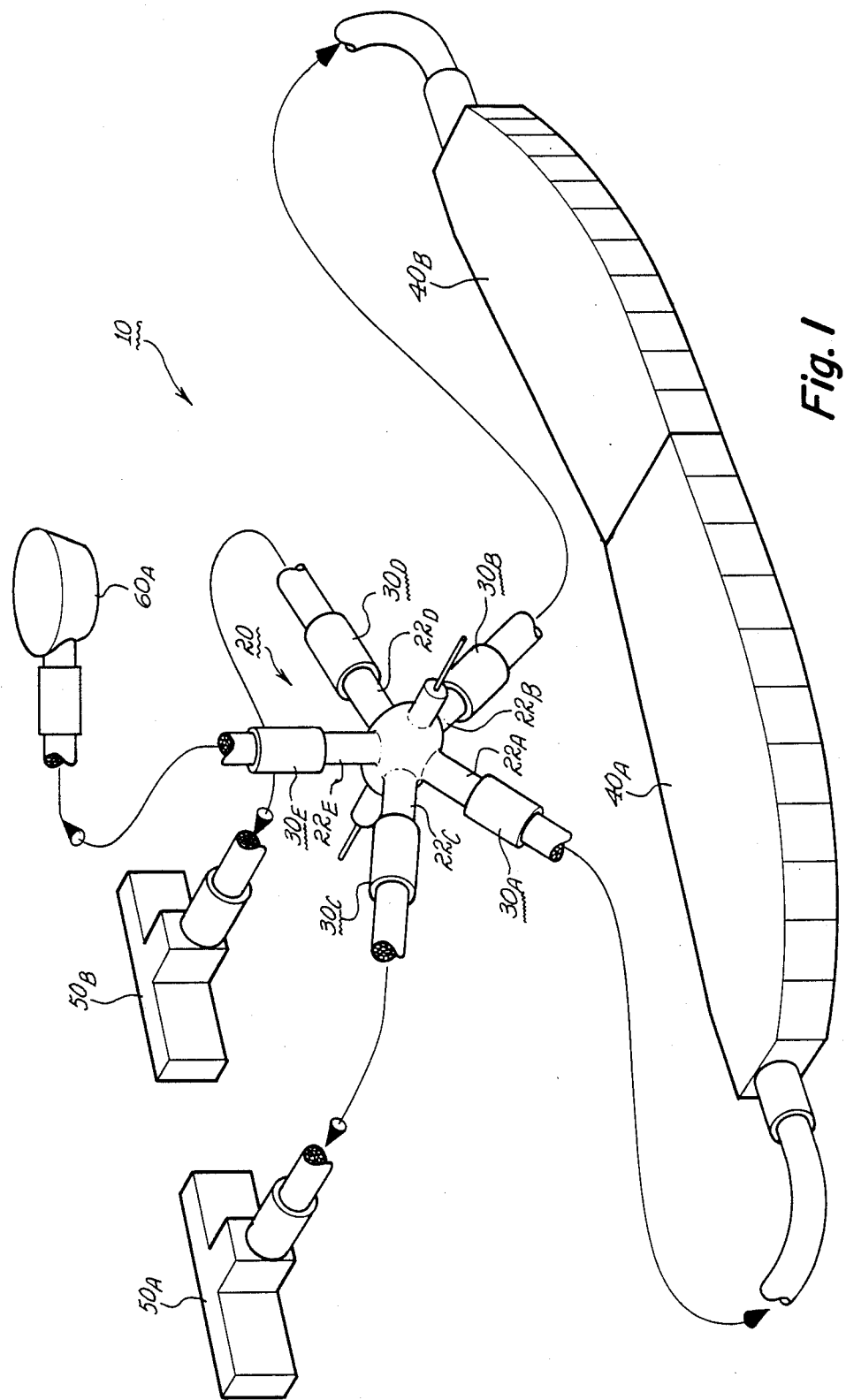
FIG. 1 is a schematic illustration of one embodiment of the present invention related to a centralized lighting system that provides the illumination needs of a vehicle.

Referring to the drawing, FIG. 1 illustrates a centralized lighting system 10 of the present invention. The system 10 illustrated in FIG. 1, for one embodiment of the present invention, provides the forward, rearward and interior illumination needs for aerodynamically styled vehicles such as automobiles or aircraft. The light generating and distribution system is applicable to various means of transportation including but not limited to cars, aircraft, boats, trucks, campers, vans, house trailers, and busses. Further, the light system 10 may be equally applicable to homes, buildings and other various environments.

The light system 10 has a high intensity light source 20 that provides all of the lumens to serve the forward, rearward, and interior illumination needs for a vehicle. As will be discussed, the lumens generated by light source 20 are distributed throughout the vehicle and are received by various devices hereinafter referred to as illuminating devices, which project the received lumens in a particular manner dependent upon their placement on or within the vehicle and the needs of the various illuminating devices. The forward illumination is provided by forward light projecting devices $40_A$ and $40_B$ serving as headlamps that are respectively coupled to the light source 20 by means of light guides $22_A$ and $22_B$, which, in turn, are respectively coupled to optical carrying devices $30_A$ and $30_B$. The light projecting devices $40_A$ and $40_B$ may have features similar to the low profile headlamps disclosed in the previously mentioned U.S. Patent Application Ser. No. 123,844. The rearward illumination is provided by illumination devices $50_A$ and $50_B$ that are respectively coupled to the light source 20 by means of optical carrying devices $30_C$ and $30_D$ and light guides $22_C$ and $22_D$ respectively. The interior illumination is provided by at least one a light utilizing or illuminating device $60_A$ that is coupled to the light source 20 by means of optical carrying device $30_E$ and light guide $22_E$. Further details of the light source 20 is shown in FIG. 2.

The light source 20 may include alternate means for generating light one such means is a gas discharge lamp having opposite neck portions $24_A$ and $24_B$ respectively housing portions of inleads $26_A$ and $26_B$. The inleads $26_A$ and $26_B$ are respectively interconnected to molybdenum foils $28_A$ and $28_B$, which, in turn, are respectively connected to electrodes $29_A$ and $29_B$. The electrodes $29_A$ and $29_B$ are spaced apart by a distance in the range of about 1 mm to about 50 mm depending on the wattage of the lamp which may range from as low as 3 watts to several kilowatts.

The light source 20 may be of a pressurized type and may comprise various fills such as described in the previously mentioned U.S. Patent Application Ser. Nos. 157,436; 157,359, now U.S. Pat. No. 4,868,458, and 157,360. In one embodiment, the pressurized fill consists of a xenon gas at a pressure in the range which may be as low as about 10 Torr to as high a pressure as about 15,000 Torr. In a further embodiment, the light source has a pressurized fill consisting of a metal halide in which the metal is selected from the group consisting of Sodium, Scandium, Thallium, Indium, Tin, Holmium and Thorium and in which the halide is selected from the group consisting of Iodine, Bromine and Chlorine. In this further embodiment, the fill further consists of mercury in the amount of about 5 mg to about 50 mg percubic centimeter of bulb volume along with an inert gas having a pressure in the range from about 10 Torr to about 15,000 Torr. In still another embodiment, the light source comprises a tungsten filament disposed therein. The tungsten filament may be contained in an envelope that is evacuated or one containing a pressurized fill of an inert gas selected from the group consisting of Nitrogen, Argon, Krypton, Xenon along with a halogen gas selected from the group consisting of Iodine, Bromine and Chlorine.

For all of the embodiments, the light source 20 preferably has a spherical, elliptical, or tubular shape, an overall length in the range of about 5 mm to about 100 mm, a central portion having an outer diameter of about 4 mm to about 25 mm and a volumetric capacity of about 0.1 cm$^3$ to about 30cm$^3$. The integrated light source of the present invention is shown in more detail in FIG. 3.

FIG. 3 is a perspective view showing the light source 20 as having a sphere-like shape with five light guides of a circular cross section having a diameter in the range of about 1 mm to about 20mm integrated into the outer surface of the envelope at about its mid-portion. The term "sphere-like" shape as used herein is meant to include an elliptical shape similar to the shape shown in FIG. 3 for light source 20. The light source 20 along with cane like light guides are of a refractory, transparent material like quartz. The light source 20 may also be formed of aluminum oxide or hard glass such as type #180 available from General Electric Company.

In the practice of the present invention, a light source 20 was formed having five light guides 22 of a diameter of 6 mm attached to the mid-section of the envelope. The envelope of light source 20 was formed by localized heating and blowing a 3 mm (inner diameter) by 5 mm (outer diameter) quartz tube to produce a 12.8 mm long by 10 mm outer diameter envelope. One end of a pre-cut 6 mm quartz solid rod was then heated as well as the area of the envelope to which the rod was to be attached. When the quartz rod was white hot and the area of the envelope to which it was attached was barely white hot, the end of the solid rod was carefully rolled onto the arc tube envelope. Rolling, rather than simply "sticking on" the rod produced a clearer joint for the transmission of light. Also, by preventing the envelope from becoming white hot, the desired spherical shape of the envelope was not altered. The ends of the light guides which were not attached to the light source were lightly fire polished to enhance their light transmission characteristic.

The lamp 20 of the present invention preferably has a diffuse reflective coating 25 on its outer surface. The coating 25 is preferably a finely divided highly reflecting type material selected from the group consisting of zirconium oxide, aluminum oxide, magnesium oxide, thorium oxide and titanium oxide. The reflective coating 25 by being placed on all of the envelope of the light source 20 except for the area of the envelope merged with the light guides $22_A \ldots 22_E$, allows for almost all the light generated by the light source 20, that is intercepted by the coating, to be reflected back to and then transmitted by the light guides $22_A \ldots 22_E$. The infrared energy is also reflected by the coating so that the temperature of the lamp may be maintained with less power than would be required without the coating, thus increasing the efficiency of the system.

The integrated light source of the present invention corrects for a problem related to color separation of illumination generated from gas discharge sources. More particularly, the color emissions produced from various ingredients in the fill of the lamp between its electrodes are commonly geometrically separated from each other wherein a blue-green color may exist substantially between the electrodes and a redish color may be transversely separated therefrom. For automotive applications, the forward illumination generated from such a discharge device may be manifested by having blue-green light focussed on one area of the road and redish light focussed on another area of the road. Such color-separated light pattern may be distracting to a viewer. The color separation problem is substantially eliminated by the practice of the present invention in that the color emissions generated and possibly separated are assisted to be mixed or integrated into a homogeneous color by the light guides being merged on the outer surface of the light source. This assistance is provided by having the light rays of the different colors which enter the light guides mixed or merged together as these light rays are internally reflected in the guides passing through the light guides on their way to transmittal by the illuminating devices.

Further, the integrated light source of the present invention having a reflective coating on the parts of its outer surface where there are no light guides forces the generated light to go out the light guides so as to improve the efficiency of light transmission compared to light sources without a reflective coating.

The preferred light transmission of light source 20 may be further enhanced by coating the ends of the light guides that are connected to the optical carrying devices 30 with a coating 27 of a heat (infrared) reflecting film formed from multiple layers which may be of a type disclosed in U.S. Pat. No. 4,588,923 of Hoegler et al. This coating 27 is interposed between the source of light 20 and the optical carrying devices 30 so as to reduce the amount of infrared energy incident on the ends of the optical carrying devices to thereby lower the temperature which the optical carrying devices must accommodate. The coating 27 reflects the infrared energy back toward the light source 20 to raise its temperature and thereby increase its operating efficiency. Further, a multilayer dielectric coating may be used to produce a particular color of light in the light guide and reflect other colors including infrared radiation back into the light source to increase efficacy.

The light source 20 consisting of an integrating sphere having the quartz light guides $22_A \ldots 22_E$ emerging therefrom, provides for an increase in the amount of light that may be developed by such a light source. This is accomplished, in part, in that the ends of the light guides $22_A \ldots 22_E$, being located a relatively long distance away from the intense arc condition of the light source 20, are cool relative to prior art devices and they may be further cooled by coupling to plastic optical fibers or liquid filled light guides $30_A \ldots 30_E$. The coolness provided by the light guides sets up an environment in which the inside surface of the light source 20 is cooled by thermal conduction into the light guides allowing for the light source to be more heavily loaded, that is, for the energy density within the light source to be higher than for a similar lamp without the light guides. Such increases are accomplished while still maintaining an acceptable inner wall temperature for longer life. For example, the light source 20 operates with an energy density two times higher than similar lamps and with a wall temperature that is not increased relative to similar lamps thereby providing an anticipated life which is the same as similar lamps.

For the dimensions and ingredients previously given for the light source 20, the amount of light developed may be from about 2,500 lumens to about 5,000 lumens. The percentage of the light output that is segmented example, for a 10 mm diameter lamp 20 that develops a total amount of lumen output of 2,500 lumens and has merged at its mid-portion five quartz light guides each of a 6 mm diameter, the amount of light emitted from each light guide will be about 500 lumens. The 2,500 lumens emitted from the lamp 20 and distributed by the light guides is sufficient to meet all of the lighting needs of an automobile. The light developed by the light source 20 may be distributed throughout the automobile by means of optical carrying devices 30 having various embodiments shown in FIGS. 4(a), 4(b) and 4(c).

The optical carrying devices $30_A \ldots 30_E$ of the present invention have the advantage of lower weight compared to copper wires. Further, the relatively cool ends of the light guides $22_A \ldots 22_E$ to which the optical carrying devices mate allow for the use of optical devices that may otherwise be disadvantageously susceptible to heat. Such optical devices include a liquid filled fiber optic device $30_A$, shown in FIG. 4(a) as being coupled to light guide $22_A$ the plastic fibers frequently used in bundles as shown in FIGS. 4(b) and 4(c). The liquid filled fiber optic device $30_A$ may be in the form of a plastic tube formed of a heat shrink material 31 overlapping and covering an outer coating 32 of the device $30_A$ so that the material 31 is placed over and shrunk onto the solid light guide $22_A$ on one end, and similarly, on the other end of light guide $22_A$ the material 31 is placed over and shrunk onto the related illuminating device $40_A$ as shown in FIG. 4(a). Conversely, for another embodiment the optical carrying device $30_A$, the heat shrink material 31 need only overlap and cover the outer surface which mates with the light guide $22_A$ as shown in FIG. 4(b).

The liquid filled fiber optic device $30_A$ may consist of a high index of refraction liquid 34 selected from the group of materials of ethylene glycol, alcohol, carbon disulfide, and water. The end of the liquid filled fiber optic device $30_A$ which mates with an illuminating device, such as $40_A$, is plugged with a glass or quartz cylindrical rod 36 which serves to couple light into the illuminating device $40_A$.

A further embodiment of the optical device $30_A$ may comprise a single fiber optic light guide where the light conducting medium is selected from the group consisting of glass, quartz, and acrylic and wherein such a medium may be cladded with a layer of a material of a lower index of refraction. Another embodiment of an optical carrying device $30_A$ is shown in FIG. 4(b) as comprising a plurality of optical fibers $38_1$, $38_2$, and $38_N$. The fiber optics may have a cladding material placed on the outer surface of each fiber and arranged into a bundle. For such an arrangement, the inner light conduction medium is commonly of a quartz material, and a cladding of a low index of refraction material preferably separates the inner medium from the outer surface. The cladding is commonly of a tefzel material.

The fibers may also be of plastic or the plastic coated silica (PCS) type and preferably consist of a bundle enclosed in a casing of nineteen (19) members each having one end pressed directly onto the light guides $22_A$ and the other end merged or placed onto the illuminating device $40_A$ The number 19 is preferred in that it forms a symmetrical hexagon pattern which is the most efficient packing of optical fibers to arrange for a circular spot of light. It is also preferred that a grease or liquid be interposed between the light transmission mediums as shown in FIG. 4(b) by reference number 33, so as to match the index of refraction of the mating mediums and increase the coupling therebetween.

An advantage of the use of optical fibers as the transmission medium for conducting light generated by the light source, is that the flexible characteristic of the fiber allows for bending the fibers with minimal light loss. Table 1 shows typical suggested bend radius for fibers of different diameters.

TABLE 1

| Diameter of Fiber (mm) | Minimum Bend Radius (mm) |
|---|---|
| 0.25 | 10 |
| 0.50 | 12 |
| 0.75 | 14 |
| 1.00 | 16 |

Another advantage of the bundled fiber optics or of solid optical device $30_A$ of FIGS. 4(a) and 4(b), is that the ends of these devices may be made into a variety of shapes for optical transmission considerations. For example, as shown in FIG. 4(c) one end of bundled optical fibers 38 may be arranged into a circular shape having the same outer diameter as the diameter of the light guides $22_A \ldots 22_E$ so that essentially all the light conducted by the light guide $22_A \ldots 22_E$ is transmitted into the optical fiber bundle 38. Similarly, the other end of the optical fiber bundle 38 may be arranged into a rectangular arrangement so as to fit into an illuminating device in an advantageous manner. An important consideration for the various arrangements is that the cross sectional area of the opposite one or more ends be substantially the same.

The amount of light transmitted from the light guides $22_A \ldots 22_E$ to the fiber bundle 38 may be increased by providing more efficient mating between the surfaces of the devices. For example, one of the major limiting factors of the efficient collection of light into a bundle of optical fibers is the amount of the bundle end area which is active fiber core relative to the overall end area. A bundle of several 1,000 micron plastic coated commercial silica (PCS) fibers may have a theoretical maximum of about 46% active core area relative to the available overall end area. A bundle of 19 fibers arranged in hexagon array may typically have only 33% active core area relative to the overall end area. Low core area active factors results in a loss of from about one-half to two-thirds of the lumens generated by the light source that is present at the bundle interface. The light losses are greatly reduced by the practice of the present invention using higher active core area fractions typically about 80% which is primarily made possible by removing the protective coating between fibers from the interior of the bundle and allowing the protective coating to remain only on the outside of the bundle. It is estimated that such protective coating removal increases the lumens coupled into the bundle of fibers by a factor of about 150%.

The utilization of one rectangular region of the fiber optic 38 of FIG. 4(c) to serve the needs of the automotive environment is shown more clearly in FIG. 5. The optical fibers $38_1 \ldots 38_N$ of cable 38 of FIG. 4(c) may be segmented into a plurality of cables $38_A \ldots 38_B \ldots$ and $38_C$ that each route a selected number of fibers $38_1 \ldots 38_N$ into optical carrying devices $42_1 \ldots 42_{10}$ shown in FIG. 5. FIG. 5 illustrates the illuminating device $40_A$, also shown in FIG. 1, as comprising a plurality of the optical light carrying devices $42_1, 42_2, 42_3, 42_4, 42_5, 42_6, 42_7, 42_8, 42_9,$ and $42_{10}$ which respectively cooperate with lens elements $44_1, 44_2, 44_3, 44_4, 44_5, 44_6, 44_7, 44_8, 44_9,$ and $44_{10}$ so that the light generated by the integrated light source is transmitted from the vehicle a-line of light distribution in a manner similar to that disclosed in the previously mentioned U.S. Pat. Application Ser. No. 123,844.

The light emitted from optical devices $42_1 \ldots 42_{10}$ is confined or focussed into various rectangular apertures so as to provide for a desired illumination pattern. For the embodiment shown in FIG. 5, three apertures $46_A$, $46_B$, and $46_C$, corresponding to cables $38_A$, - $38_B$ and $38_C$, of decreasing relative dimensions are respectively provided for optical devices $42_1, 42_2, 42_3, -42_4, 42_5, 42_6,$ - and $42_7, 42_8, 42_9,$ and $42_{10}$. Such an arrangement provides a tapered array in which the maximum light is transmitted by optical devices $42_1, 42_2,$ and $42_3$ and decreases in selected amounts toward devices $42_7, 42_8, 42_9,$ and $42_{10}$.

The principles of the present invention of utilizing rectangular portions such as $46_A$ $46_B$ and $46_C$ to provide desired illumination needs of an automobile may be followed for the selection of the lens elements that may be utilized to provide forward and rearward illumination for the vehicle. For example, such lens elements used for automotive application have a typically low F number and are used to focus the image appearing at the ends of the optical fiber bundle at about 60 ft. from an automobile which is very large (infinity) when compared to a lens diameter of about 1.5 inches. The low F number lens having a diameter of 1.5 inches may be cut down to a one inch square so as to eliminate any lost space in a one inch tall lens array $40_A$ shown in FIG. 5. It is also desired to use aspherical lenses in automotive applications to reduce the spherical aberrations which may be significant in related low F number lenses.

Some of the low F number aspheric lenses may be replaced by aspheric cylindrical lenses which only focus the beam in the vertical direction and allow it to spread in the horizontal direction. This reduces any glare in the eyes of the oncoming driver but provides a widely spread beam from curb to curb. The achievement of such a beam pattern may be described with reference to FIG. 6.

Figure 6:
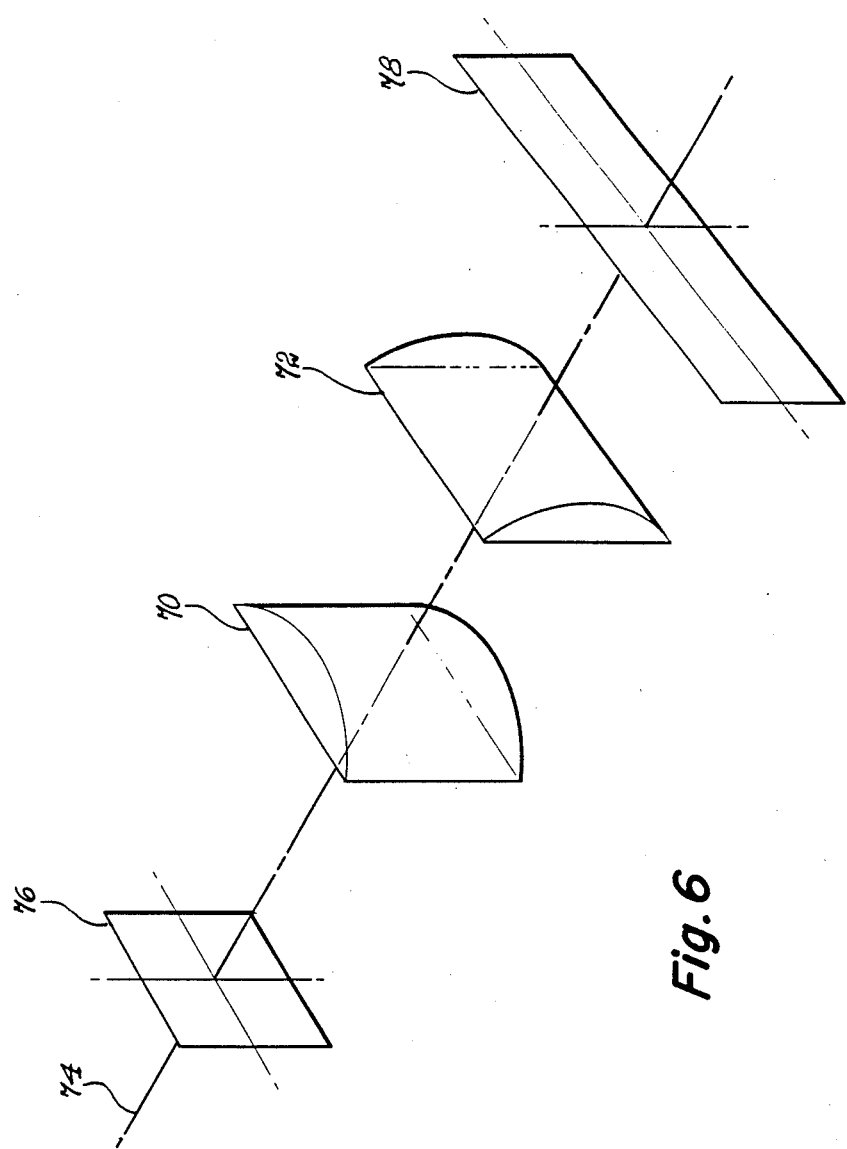
FIG. 6 is a schematic illustrating the lens arrangements that provide the direct and spread light related to the forward illumination needs of a vehicle.

FIG. 6 illustrates two (2) aspheric cylindrical lenses 70 and 72 arranged about a center line 74 and interposed between a square-like object 76 and a rectangular image 78. The cylindrical portions of lenses 70 and 72 are off-set from each other by an angle of about 90 degrees. The lens 70 magnifies the light rays initiating from object 76 in a horizontal direction, whereas, lens 72 magnifies these same rays in a vertical direction. The combined operation of lenses 70 and 72 develop the rectangular image 78. The aspect ratio of the image 78 depends on the selected focal lengths. The selection of different focal lengths results in different magnifications in the vertical and horizontal directions. As shown in FIG. 6, a square-like object 76 forms a rectangular image 78. An advantage of the arrangement of FIG. 6 is that different rectangular images may be developed from identical objects.

It should now be appreciated that the practice of the present invention provides for a centralized lighting system having a high brightness light source formed into an integrated sphere having light guides attached thereto with one of their ends connected to optical carrying devices which may conduct the light into various lens and illuminating device arrangements.

It should be further appreciated that the light guides emanating from the light source act as heat sinks which allows for the operation of a light source while maintaining its temperature and therefore its anticipated life. The light source also is fed into bundles of fiber optics which have their ends arranged into various shapes to serve the needs of the illumination patterns desired for an automobile. Usage of the bundled fibers is also disclosed in which the protective material normally present is removed from each of the optical fibers so that the amount of lumens coupled into the bundle may be increased over prior art methods by a factor of about 50%. Further, the small dimensions, mentioned with reference to Table 1, of the fiber optics related to the present invention allow for more uniform light patterns to be focused onto the road. The small fiber optics act in a similar manner as a point source allowing the related light output to be accurately directed into a desired direction. The usage of cylindrical aspheric lenses in place of circular aspheric lenses allows for the light generated by the present invention to be focused into the vertical and horizontal directions to respectively serve as direct and spread light for the automobile.

Further still, the light source of the present invention integrates the generated light into a homogenous color unlike some prior art discharge devices manifesting color separation of its illuminated pattern. Further, the integrated light source of the present invention has a reflective coating on the parts of its outer surface where there are no light guides so as to force the generated light to go out the light guides in a manner to improve the efficiency of light transmission compared to light sources without a reflective coating.

Still further, the high intensity light source of the present invention may have a heat reflective filter interposed between the light source and the optical fiber so as to reduce the amount of energy incident upon the fibers. Further, the light source may have a filter that blocks the transmission of ultraviolet radiation which may otherwise degrade epoxy and plastic components related to the light generating system.

Further still, although for the embodiments illustrated in FIGS. 4(a) and (b) the light guide is joined to the light source 20, the practice of this invention contemplates that the light guide may be coupled to the light source without the physical mating therebetween. It is preferred that the maximum light be transferred between these mediums and therefore joining therebetween is desired as shown in FIGS. 4(a) and 4(b).

What we claim as new and desire to secure by Letters Patent of the United States is:

1. A light source for vehicles comprising;
    (a) an envelope formed of a light transmissive material and containing light generating means, and
    (b) light guide means formed of a light transmissive material and merged onto the outer surface of said envelope without substantially altering the shape of said envelope and without substantially extending into said envelope,
    said light guide means having parameters that are selected to provide forward, rearward or interior illumination for said vehicle developed by said light generating means.

2. A light source according to claim 1 wherein said envelope is formed of a refractory transparent material selected from the group consisting of quartz, aluminum oxide and hard glass.

3. A light source according to claim 1 wherein said light guide means is formed of a refractory transparent material.

4. An light source according to claim 1 wherein said light generating means comprises a tungsten filament.

5. A light source according to claim 4 wherein said envelope contains a pressurized fill of an inert gas selected from the group consisting of Nitrogen, Argon, Krypton and Xenon along with a halogen gas selected from the group consisting of Iodine, Bromine, and Chlorine.

6. A light source according to claim 1 wherein said envelope has a shape selected from the group of shapes consisting of spherical and elliptical.

7. A light source according to claim 1 wherein said light generating means comprises a pair of electrodes one of each being positioned at opposite ends of said envelope.

8. A light source according to claim 1 wherein said envelope contain a pressurized fill which consists of a xenon gas at a pressure in the range of about 10 Torr to about 15,000 Torr, said envelope and said light guide means merged at the outer surface of said envelope cooperating to integrate the light generated by said internal light generating means into a homogeneous color.

9. A light source according to claim 1 wherein said envelope contains a pressurized fill consisting of (1) a metal halide in which the metal is selected from the group consisting of Sodium, Scandium, Thallium, Indium, Tin, Holmium and Thorium and in which the halide is selected from the group consisting of Iodine, Bromine and Chlorine, (2) mercury in the amount of about 5 mg to about 50 mg per cubic centimeter of envelope volume and (3) a xenon gas having a pressure in the range from about 10 Torr to about 15,000 Torr, said envelope and said light guide means merged at the outer surface of said envelope cooperating to integrate the light generated by said internal light generating means into a homogeneous color.

10. A light source according to claim 1 wherein the outer surface of said envelope, except at the merger of said at least one light guide, has a diffuse reflective coating of a finely divided highly reflecting type material selected from the group consisting of zirconium oxide, thorium oxide and titanium oxide.

11. A light source according to claim 1 wherein one end of said light guide means has a coating of an infrared reflecting film.

12. A light source according to claim 1 wherein one end of said light guide means has a coating which blocks the transmission of ultraviolet radiation.

13. A light source according to claim 1 wherein one end of said at least one light guide has a coating that produces a particular color and reflects other colors including infrared radiation back into said light source.

14. A light source according to claim 1 wherein said envelope comprises;
    (a) a volumetric capacity in the range of about 0.1 cm$^3$ to about 30 cm$^3$; and
    (b) an overall length of about 5 mm to about 100 mm; and
    (c) a central portion having an outer diameter of about 4 mm to about 25 mm.

15. A light source according to claim 1 wherein said light guide comprises
    a solid cylindrical member having a diameter of about 1 mm to about 10 mm and a length of about 5 mm to about 50 mm.

16. A light source according to claim 7 wherein said electrodes are spaced apart from each other by a distance in the range of about 1 mm to about 50 mm.

17. A light generating and distribution system for a vehicle comprising;
    (a) a light source, adapted to be located at a central location within said vehicle, comprising an envelope formed of a light transmissive material and containing light generating means, said light source further comprising light guide means formed of a light transmissive material and merged onto the outer surface of said envelope without substantially altering the shape of said envelope and without substantially extending into said envelope;
    (b) light carrying means respectively coupled at one end of each of said light guide means; and
    (c) an illuminating device adapted to be remotely located on said vehicle from said light source and connected to the other end of said respective light carrying means
    said light guide means, said light carrying means, and said remote illuminating device each having parameters that are selected to provide the forward, rearward or interior illumination needs for said vehicle.

18. A light generating and distribution system according to claim 17 wherein one end of said light guide means has a coating of an infrared reflecting film.

19. A light generating and distribution system according to claim 17 wherein one end of said light guide means has a coating which produces a particular color and reflects other colors including infrared radiation back into the light source.

20. A light generating and distribution system according to claim 17 wherein one end of said light guide means has a coating which blocks the transmission of ultraviolet radiation.

21. A light generating and distribution system according to claim 17 wherein said light carrying means comprises;
    a transparent liquid filled fiber optic cable having an outer coating formed of a heat shrink plastic material that is shrunk onto one end of each of said light guide means, said liquid filled optic fiber cable further having a transparent cylindrical plug closing its other end.

22. A light generating and distribution system according to claim 21 wherein said fiber optic cable is filled with a high index of refraction liquid selected from the group consisting of ethylene glycol, alcohol, carbon disulfide, and water.

23. A light generating and distribution system according to claim 17 wherein said optical carrying device comprises;
   a single fiber optic light guide where the light conducting medium is selected from the group consisting of glass, quartz, and acrylic and which medium is cladded with a material having a lower index of refraction.

24. A light generating and distribution system according to claim 17 wherein said optical carrying device comprises;
   a plurality of optical fibers arranged into a bundle which is devoid of any cladding material between fibers but has a protective coating covering the outer surface of the bundle.

25. A light generating and distribution system according to claim 17 wherein said light carrying means comprises;
   a plurality of optical fibers forming a bundle and the outer optical fibers of the bundle have a cladding material forming their outer surface and the inner optical fibers of the bundle being devoid of any cladding material.

26. A light generating and distribution system according to claim 17 wherein said light carrying means has a circular shape at said end connected to said light guide means.

27. A light generating and distribution system according to claim 17 wherein said light carrying means has a rectangular shape at said end connected to said illuminating device.

28. A light generating and distribution system according to claim 24 wherein said optical fibers are arranged into a circular array at said end connected to said light guide means.

29. A light generating and distribution system according to claim 24 wherein said optical fibers are arranged into a rectangular array at said end connected said illuminating device.

30. A light generating and distribution system according to claim 17 further comprising;
   a first and a second cylindrical lens element offset from each other by an angle of about 90 degrees and interposed at a predetermined distance between the light carrying and the illuminating device furnishing the illuminator needs for the forward lighting of said vehicle, said first lens being capable of controlling light transmitted from said illuminating device in a horizontal manner and said second lens being capable of controlling the light transmitted from said illuminating device in a vertical manner.

31. A light generating and distribution system according to claim 17 wherein said illuminating device comprises;
   a plurality of connectors having arranged therein a plurality of optical carrying devices, each of said connectors having an aperture at one end of predetermined dimensions for allowing light to pass therethrough, and
   a plurality of lens elements arranged to be respectively coupled to said apertures of said connectors.

32. A light generating and distribution system according to claim 17 wherein said light generating means comprises a tungsten filament.

33. A light generating and distribution system according to claim 17 wherein said light generating means consists of a discharge light source having a pressurized fill, and wherein said envelope and said light guide means merged at the outer surface of said envelope cooperate to integrate the light generated by said light generating means into a homogeneous color.

34. A light generating and distribution system according to claim 17 wherein said light source furnishes the forward, rearward and interior lighting needs of said vehicle, there being one light guide means and one light carrying means coupling light to each illuminating device of said vehicle.

35. A light generating and distribution system according to claim 33 wherein the envelope of said light source is coated with a diffuse coating on the surface thereof other than where said light guide means is merged to the surface so as to reflect light into said light carrying means which further contributes to said homogeneous color of said light generating means.

36. A light generating and distribution system according to claim 17 wherein one end of said light guide means has a coating which reflects infrared light back toward said light source to increase operating efficiency of the light source.

37. A light generating and distribution system according to claim 17 wherein the light guide means substantially reduces the temperature of the light source along its walls.

* * * * *